US008743810B2

(12) United States Patent
Park et al.

(10) Patent No.: US 8,743,810 B2
(45) Date of Patent: Jun. 3, 2014

(54) APPARATUS AND METHOD FOR ALLOCATING ONE OR MORE RESOURCES TO REDUCE RESOURCE HOLE IN A WIRELESS ACCESS SYSTEM

(75) Inventors: Sungho Park, Gyeonggi-Do (KR); Sunam Kim, Gyeonggi-Do (KR); Youngsoo Yuk, Gyeonggi-Do (KR); Jeongki Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 13/383,574

(22) PCT Filed: Jul. 16, 2010

(86) PCT No.: PCT/KR2010/004649
§ 371 (c)(1),
(2), (4) Date: Jan. 11, 2012

(87) PCT Pub. No.: WO2011/008046
PCT Pub. Date: Jan. 20, 2011

(65) Prior Publication Data
US 2012/0120902 A1   May 17, 2012

Related U.S. Application Data

(60) Provisional application No. 61/226,295, filed on Jul. 17, 2009.

(30) Foreign Application Priority Data

Jul. 15, 2010 (KR) .................... 10-2010-0068652

(51) Int. Cl.
*H04W 72/04* (2009.01)
(52) U.S. Cl.
USPC .......................................... 370/329

(58) Field of Classification Search
USPC ........................... 370/254–350; 709/201–213
IPC ......................................... H04W 72/04,72/0406
See application file for complete search history.

(56) References Cited

U.S. PATENT DOCUMENTS

| 6,311,056 | B1 * | 10/2001 | Sandidge | 455/414.1 |
| 7,970,906 | B2 * | 6/2011 | Oh et al. | 709/226 |
| 8,374,109 | B2 * | 2/2013 | Luo et al. | 370/310 |
| 8,385,279 | B2 * | 2/2013 | Lim et al. | 370/329 |

FOREIGN PATENT DOCUMENTS

| KR | 1020090008848 | 1/2009 |
| KR | 1020090031234 | 3/2009 |
| KR | 1020090039594 | 4/2009 |

* cited by examiner

*Primary Examiner* — Ayaz Sheikh
*Assistant Examiner* — Debebe Asefa
(74) *Attorney, Agent, or Firm* — Lee, Hong, Degerman, Kang & Waimey (57) ABSTRACT

Disclosed is a method for receiving allocated resources, by a terminal, in a wireless access communication system. In particularly, the present invention is to provide a method for receiving one or more resources in a wireless access communication system, the method comprising: receiving a control message from a network; checking the received control message whether the control message includes resource shift information; and receiving the one or more resources according to the resource shift information if it is checked that the control message includes the resource shift information, wherein the resource shift information comprises at least one of a resource shift indicator, a resource shift offset and a feedback allocation information.

10 Claims, 4 Drawing Sheets

APPARATUS AND METHOD FOR ALLOCATING ONE OR MORE RESOURCES TO REDUCE RESOURCE HOLE IN A WIRELESS ACCESS SYSTEM

CROSS-REFERENCE TO RELATED APPLICATIONS

This application is the National Stage filing under 35 U.S.C. 371 of International Application No. PCT/KR2010/004649, filed on Jul. 16, 2010, which claims the benefit of earlier filing date and right of priority to Korean Application No. 10-2010-0068652, filed on Jul. 15, 2010, and also claims the benefit of U.S. Provisional Application Ser. No. 61/226,295, filed on Jul. 17, 2009, the contents of which are all incorporated by reference herein in their entirety.

TECHNICAL FIELD

The present invention relates to a wireless communication system, and particularly, to a persistent resource allocation or group resource allocation method in a mobile communication system.

BACKGROUND ART

A Persistent Resource Allocation (PRA) is a technique used to reduce an assignment overhead for connections with a periodic traffic pattern and with a relatively fixed payload size.

In an IEEE 802.16e system, to allocate resources persistently, a base station (BS) shall transmit the Persistent HARQ DL MAP IE for DL allocations and the Persistent HARQ UL MAP IE for UL allocations. The persistently allocated resource and the modulation and coding scheme (MCS) shall be maintained by the BS and mobile station (MS) until the persistent assignment is de-allocated, changed, or an error event occurs. Persistent Scheduling does not include special arrangements for retransmission of data initially transmitted using persistently allocated resources. Resources for retransmissions can be allocated one at a time as needed using either HARQ DL/UL MAP IE or Persistent HARQ DL/UL MAP IE. Persistent scheduling is defined for OFDMA PHY option only.

Also, in the IEEE 802.16m system, Persistent allocation is a technique used to reduce assignment overhead for connections with periodic traffic pattern and with relatively fixed payload size. To allocate resources persistently to a single connection, a advanced base station (ABS) shall transmit the DL Persistent Allocation advanced map (A-MAP) IE for DL allocations and the UL Persistent Allocation A-MAP IE for UL allocations. The configuration parameters of the persistently allocated resource shall be maintained by the ABS and advanced mobile station (AMS) until the persistent assignment is de-allocated, changed, or an error event occurs. Persistent scheduling does not include special arrangements for HARQ retransmission of data initially transmitted using persistently allocated resources. Resource for each DL retransmission shall be allocated using a using a DL Basic Assignment A-MAP IE. Resource for an UL retransmission shall be allocated using a using a UL Basic Assignment A-MAP IE only when control information for the retransmission changes.

A Group Resource Allocation mechanism allocates resources to multiple users as a group in order to save control overhead. Group Resource Allocation may be used for connections with a periodic traffic pattern and with relatively fixed payload size.

DISCLOSURE OF INVENTION

Solution to Problem

Therefore, an object of the present invention is to provide a method for receiving one or more resources in a wireless access communication system, the method comprising: receiving a control message from a network; checking the received control message whether the control message includes resource shift information; and receiving the one or more resources according to the resource shift information if it is checked that the control message includes the resource shift information, wherein the resource shift information comprises at least one of a resource shift indicator, a resource shift offset and a feedback allocation information.

Also, the present invention further includes the step of transmitting, to the network, a response message in response to the received control message.

Also, the present invention further includes the resource shift offset has a positive value or a negative value.

Also, the present invention further includes the step of receiving a message including an indicator for informing whether the terminal checks the resource shift information included in the control message when the control message is a common control message.

Also, the present invention further includes the indicator is included in a broadcast message or non-user specific control message.

Also, the present invention further includes the control message is a Persistent Allocation Advanced-MAP Information Element.

Also, the present invention further includes the control message is a Group Resource Allocation Advanced-MAP Information Element.

Also, the present invention further includes the control message further includes information regarding a persistent allocation period.

Another object of the present invention is to provide an apparatus for receiving one or more resources from a network in a wireless access communication system, the apparatus comprising: a receiver for receiving a control message including a resource shift information and persistently allocated resources; a message interpreter for checking the received control message whether the control message includes resource shift information; and wherein the resource shift information comprises a resource shift indicator, a resource shift offset and a feedback allocation information.

Also, the present invention further includes a transmitter for transmitting, to the network, a response in response of the received control message.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention.

Also, it should be noted that the accompanying drawings are merely illustrated to easily explain the spirit of the invention, and therefore, they should not be construed to limit the spirit of the invention by the accompanying drawings.

Hereinafter, the term "terminal" is used, but the terminal may be also referred to as a subscriber station (SS), user equipment (UE), mobile equipment (ME), a mobile station (MS), and an advanced mobile station (AMS). Furthermore, the terminal may be portable equipment having a communication function such as portable phone, PDA, smart phone, notebook, etc., or non-potable equipment such as PC, vehicle mounted device, etc.

Figure 1:
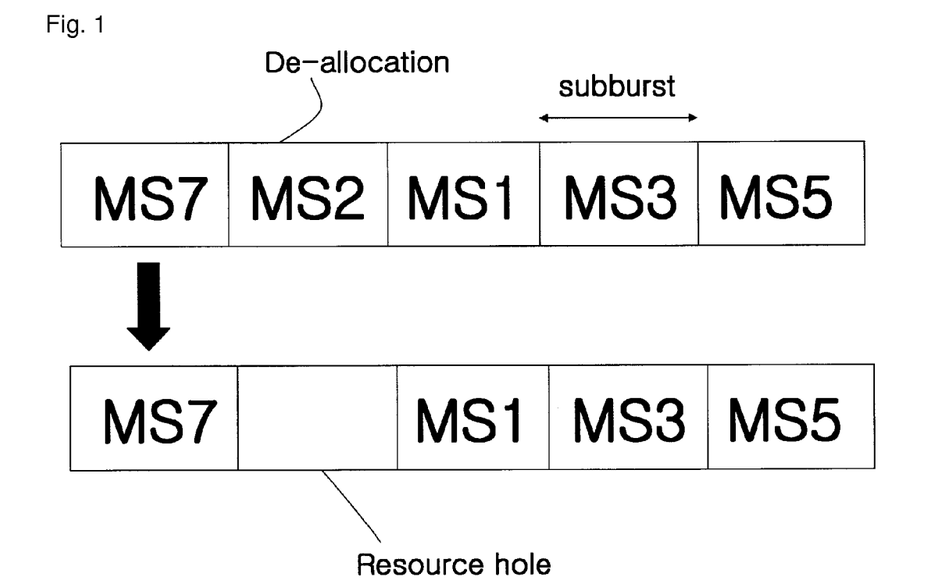
FIG. 1 illustrates the example of resource hole.

First, FIG. 1 illustrates the example of resource hole.

When a persistently allocated resource is de-allocated, if there is no new packet at the resource or there is new packet but the size is different, then the resource is kept emptying until new packet which has same resource size is allocated at there.

About the methods for reducing resource holes, it will be considered below with reference to drawings.

To resolve the problem, there are two methods. The first method is resource shifting, and the second one is that related packets are newly allocated.

Figure 2:
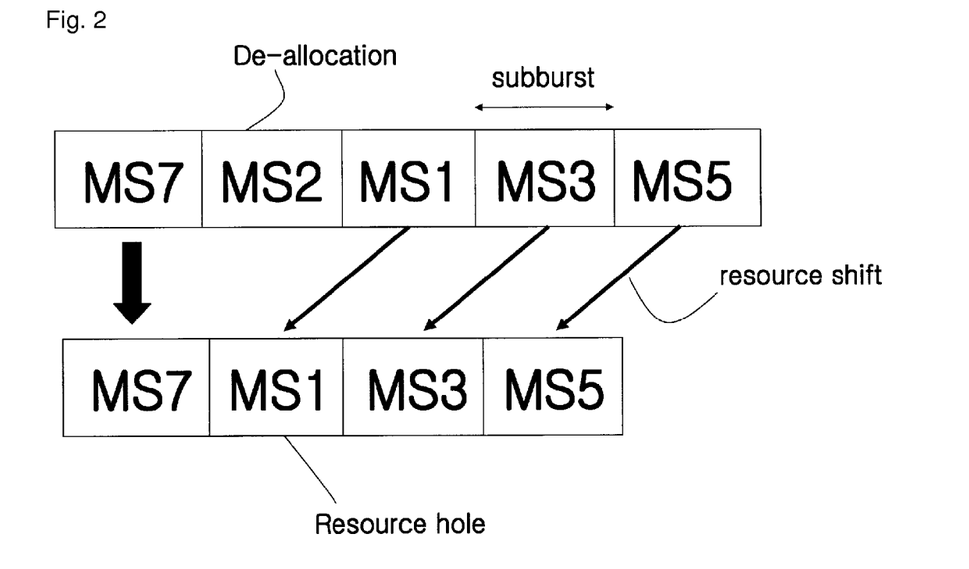
FIG. 2 illustrates the exemplary operation of resource shifting where the resource of MS2 is de-allocated.

FIG. 2 illustrates the exemplary operation of resource shifting where the resource of MS2 is de-allocated.

For downlink operation, if the Resource Shifting Indicator in the subburst IEs of the Persistent HARQ DL MAP allocation IE is set to '1', the MS shall shift its persistent resource position by the accumulated slots as indicated by de-allocation commands with slot offsets smaller than its own.

For uplink operation, if the Resource Shifting Indicator in the subburst IEs of the Persistent HARQ UL MAP allocation IE is set to '1', the MS shall shift its persistent resource position by the accumulated slots as indicated by de-allocation commands with slot offsets smaller than its own. Note that in this case the MS shifts its resource allocation in response to the subburst IE with RCID different from its own.

When the Resource Shifting Indicator is set to '0', the MS shall not shift its persistent resource position in response to subburst IEs with RCID different from its own. Since MS1, MS3 and MS5 are located after MS2, their slot offset values are larger than that of MS2. Therefore, their slot position is shifted to remove the resource hole.

This method is very simple, but it has some problems. All relative bottom resources should perform the shifting and the shifts are performed to one-way direction. If there are many resource hole, the MCS mismatch is increased rapidly. Moreover, if the receiving of Persistent HARQ UL MAP allocation IE is failed and there is error in MAP NACK as well, all related packets can not be received until next scheduling is performed.

The second method is a new Persistent Resource Allocation.

In this method, there are two cases. First case is a new MAP allocation related with persistent scheduling individually. In this case, the scheduler re-allocates all related resource using individual persistent allocation MAP.

Second case is Common MAP allocation related with persistent scheduling

This kind of method has been considering in IEEE 802.16m. The DL/UL Composite Persistent A-MAP IE can be utilized when the persistently allocated resource is allocated, de-allocated, modified.

But, in these methods, the overhead to indicate resource position and size is very large.

When new packet allocation is required after the persistently allocated resource is deallocated, the BS tries to adjust resource allocation for both already allocated resources and new resources according to scheduling policy. If there are no packets which require the empty resource, a resource hole is created and the resource can not be allocated for the persistent allocation.

The proposed method can reduce the resource hole efficiently.

In proposed method, to adjust resource allocation between new packet and persistently allocated packet, certain control channel is referred. This control channel includes resource shifting information such as shift offset and user identifier (or reduced version). Additionally, the shift offset information can be shared with certain MSs who have same shift offset value while they are allocated at that time. The shift offset value is two-way values—i.e.) positive values and negative values.

This control channel has two types. A first type is Common (or shared) Control Channel. It has reduced resource overhead but all persistent allocated MSs confirm it.

The Common Control Channel includes parameters below.

(1) Number of Allocations: Number of allocation specified (2) User Identifier: e.g.) UID or CID or STID or their reduced version (3) Control Channel Type (or Allocation Period): Allocation (or Allocation Period)/De-allocation (4) Resource Shift Indicator 0b0: No resource shift 0b1: Resource Shift (5) Shift Offset: Resource Shift Value.

The value is comprised with negative value and positive value. e.g.) 4 bits shift offset value: $\{-8, -7, -6, \ldots, -1, 1, 2, \ldots 6, 7, 8\}$ The unit of this value is minimum allocation size. e.g.) Resource Unit (RU) or Subchannel (6) HARQ Information: HARQ Feedback Allocation, ACID, etc.

(7) Allocation Shift Indicator

0b0: it indicates that shift value is explicitly assigned for this allocation.

0b1: this allocation will use the same shift offset as the previous subburst.

Figure 3:
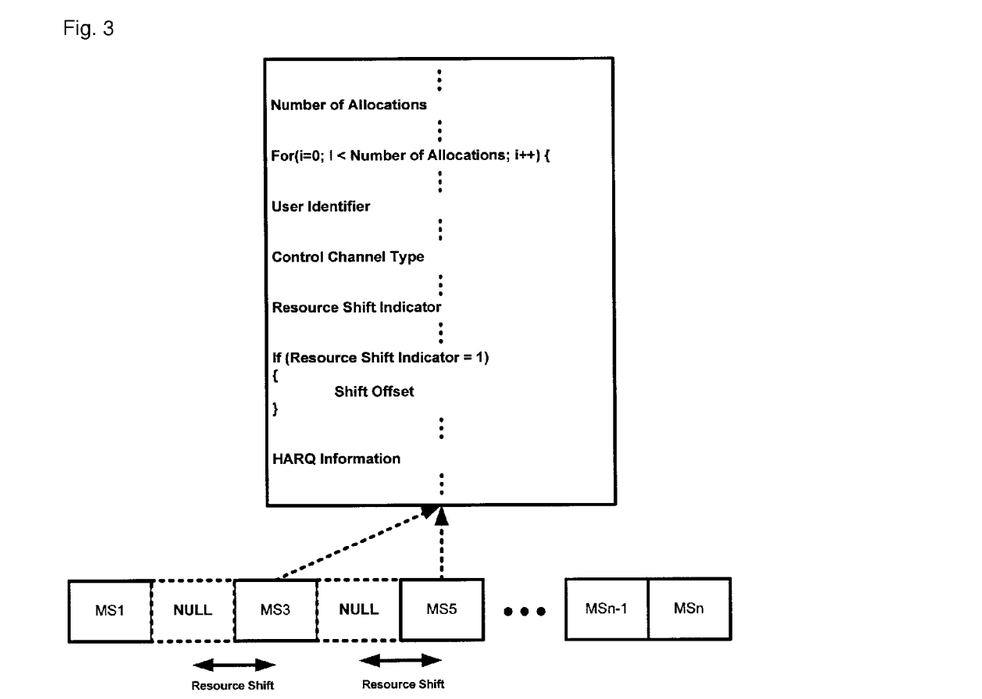
FIG. 3 illustrates parameters regarding the resource shift information included in the Common Control Channel.

FIG. 3 illustrates parameters regarding the resource shift information included in the Common Control Channel.

Hereinafter, tables 1 to 2 show the exemplary embodiments of Group Resource Allocation A-MAP IE including the resource shift information parameters.

TABLE 1

| Syntax | Size (bit) | Description/Notes |
|---|---|---|
| Group_Resource_Allocation_A-MAP_IE( ) { | — | — |
| A-MAP IE Type | 4 | Group Resource Allocation A-MAP IE |
| Allocation Period | 2 | Period of persistent allocation. If (Allocation Period == 0b00), it indicates the deallocation of a persistently allocated resource. 0b00: deallocation modification 0b01: 2 frames 0b10: 4 frames 0b11: 8 frames |
| if(Allocation Period == 0b00) { If(Resource Shift Indicator == 1) { Shift Offset | 4 | Shifted Subchannel offset value 0b0000: −8 0b0001: −7 0b0010: −6 0b0011: −5 0b0100: −4 0b0101: −3 0b0110: −2 0b0111: −1 0b1000: +1 0b1001: +2 0b1010: +3 |

TABLE 1-continued

| Syntax | Size (bit) | Description/Notes |
|---|---|---|
| | | 0b1011: +4 0b1100: +5 0b1101: +6 0b1110: +7 0b1111: +8 |
| } HFA Offset | 6 | Indicates the start of the HARQ feedback channel index used for scheduled allocations. |
| } else { | | |
| ... | | ... ... |

Before the table 1 and a table 2 are described, Persistent Allocation (PA) should support Group Resource Allocation A-MAP IE including the resource shift information. Therefore, in this case, the Group Resource Allocation A-MAP IE further includes the Resource Allocation Duration for the PA, Resource Shift Indicator and etc.

In table 1, the resource shift indicator shows indication whether the resources of terminals allocated persistent resource is shifted. And the resource shift indicator is represented in 1 bit. For example, if the resource shift indicator is set to '0', it is no resource shift, and if the resource shift indicator is set to '1', the resource is shifted.

The resource shift offset is comprised with negative value and positive value. That is, the negative value is −, and the positive value is +. And the resource shift offset is represented in 4 bits.

The 4 bits shift offset value has $\{-8, -7, -6, \ldots, -1, +1, \ldots, +6, +7, +8\}$.

The unit of the resource shift offset is minimum allocation size. For example, it may be Resource Unit (RU) or Subchannel.

Also, if the control message is the common control message, multiple resource shift offsets can be included in the control message.

The HFA (HARQ Feedback Allocation) is included in the control message to confirm whether receiving of the control channel regarding persistent allocation correctly or not.

TABLE 2

| Syntax | Size (bit) | Description/Notes |
|---|---|---|
| Group_Resource_Allocation_A-MAP_IE( ) { | — | — |
| A-MAP IE Type | 4 | Group Resource Allocation A-MAP IE |
| Allocation Period | 2 | Period of persistent allocation. If (Allocation Period == 0b00), it indicates the de-allocation of a persistently allocated resource. 0b00: deallocation/modification 0b01: 2 frames 0b10: 4 frames 0b11: 8 frames |
| if(Allocation Period == 0b00) { If(Resource Shift Indicator == 1) { User Bitmap | Variable | Bitmap to indicate scheduled AMSs in a group. The size of the bitmap is equal to the User Bitmap Size signaled to each AMS in the Group configuration MAC control message. 0b0: AMS not allocated in this AAI subframe 0b1: AMS allocated in this AAI subframe |
| Resource Offset | 7 | Indicates starting LRU for resource assignment to this group |
| Resource Assignment Bitmap | Variable | Bitmap to indicate burst size/resource size for each scheduled AMS |

TABLE 2-continued

| Syntax | Size (bit) | Description/Notes |
|---|---|---|
| } | | |
| HFA Offset | 6 | Indicates the start of the HARQ feedback channel index used for scheduled allocations. |
| } else { | | |
| ... | ... | ... |

A second type is Individual Control Channel. In this case, the control channel is transmitted to each persistent allocation MS individually. When the number of MSs regarding persistent allocation is increased, total resource overhead is increased rapidly.

(1) Control Channel Type (or Allocation Period): Allocation (or Allocation Period)/De-allocation (2) Resource Shift Indicator: 0 ? No resource shift, 1 ? Resource Shift (3) Shift Offset: Resource Shift Value e.g.) 4 bits shift offset value: {−8, −7, 6, ..., −1, 1, 2, ... 7, 8}

(4) HARQ Feedback Allocation, ACID, etc.

Figure 4:
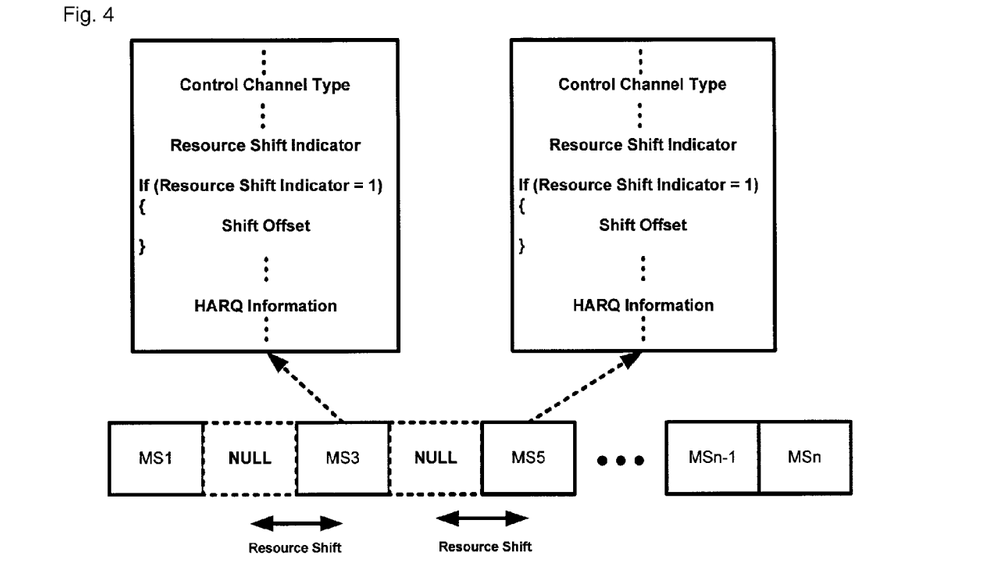
FIG. 4 illustrates parameters regarding the resource shift information included in the Individual Control Channel.

FIG. 4 illustrates parameters regarding the resource shift information included in the Individual Control Channel.

Hereinafter, tables 3 to 9 show the exemplary embodiments of DL Persistent Allocation A-MAP IE including the resource shift information parameters.

The Resource Index field in the DL Persistent Allocation A-MAP IE is interpreted as in the DL Basic Assignment A-MAP IE. If Resource Shift Indicator field is active, previous Resource Index field is still effective along with resource Shift Offset field.

TABLE 3

| Syntax | Size (bit) | Description/Notes |
|---|---|---|
| DL Persistent Allocation A-MAP_IE( ) { | — | — |
| ... | ... | ... |
| Resource Shift Indicator | 1 | 0b0: No resource shift<br>0b1: Resource is shifted |
| If(Resource Shift Indicator == 1) { | | |
| Shift Offset | 4 | Shifted Subchannel offset value<br>0b0000: −8<br>0b0001: −7<br>0b0010: −6<br>0b0011: −5<br>0b0100: −4<br>0b0101: −3<br>0b0110: −2<br>0b0111: −1<br>0b1000: +1<br>0b1001: +2<br>0b1010: +3<br>0b1011: +4<br>0b1100: +5<br>0b1101: +6<br>0b1110: +7<br>0b1111: +8 |
| HFA | 3 | HARQ Feedback Allocation for control channel including resource shift information |
| Reserved | 4 | Reserved bits |
| } else { | | |
| ... | ... | ... |
| Reserved | 1 | Reserved bits |

TABLE 4

| Syntax | Size (bit) | Description/Notes |
|---|---|---|
| DL Persistent Allocation A-MAP_IE( ) { | — | — |
| A-MAP IE Type | 4 | DL Persistent Allocation A-MAP IE |
| Resource Shift Indicator | 1 | 0b0: No resource shift<br>0b1: Resource is shifted |
| If(Resource Shift Indicator == 1) { | | |
| Shift Offset | 4 | Shifted Subchannel offset value<br>0b0000: −8<br>0b0001: −7<br>0b0010: −6<br>0b0011: −5<br>0b0100: −4<br>0b0101: −3<br>0b0110: −2<br>0b0111: −1<br>0b1000: +1<br>0b1001: +2<br>0b1010: +3<br>0b1011: +4<br>0b1100: +5<br>0b1101: +6<br>0b1110: +7<br>0b1111: +8 |
| HFA | 3 | HARQ Feedback Allocation for control channel including resource shift information |
| N_ACID | 2 | Number of ACIDs for implicit cycling of HARQ channel identifier.<br>0b00: 2<br>0b01: 3<br>0b10: 4<br>0b11: 8 |
| Initial_ACID | 4 | Initial value of HARQ channel identifier for implicit cycling of HARQ channel identifiers. |
| Reserved | 22 | Reserved Bits |
| ... | ... | ... |

TABLE 5

| Syntax | Size (bit) | Description/Notes |
|---|---|---|
| DL Persistent Allocation A-MAP_IE( ) { | — | — |
| A-MAP IE Type | 4 | DL Persistent Allocation A-MAP IE |
| Resource Shift Indicator | 1 | 0b0: No resource shift<br>0b1: Resource is shifted |
| If(Resource Shift Indicator == 1) { | | |
| Shift Offset | 4 | Shifted Subchannel offset value<br>0b0000: −8<br>0b0001: −7 |

TABLE 5-continued

| Syntax | Size (bit) | Description/Notes |
|---|---|---|
| | | 0b0010: −6 |
| | | 0b0011: −5 |
| | | 0b0100: −4 |
| | | 0b0101: −3 |
| | | 0b0110: −2 |
| | | 0b0111: −1 |
| | | 0b1000: +1 |
| | | 0b1001: +2 |
| | | 0b1010: +3 |
| | | 0b1011: +4 |
| | | 0b1100: +5 |
| | | 0b1101: +6 |
| | | 0b1110: +7 |
| | | 0b1111: +8 |
| ISizeOffset | 5 | Offset used to compute burst size index |
| HFA | 3 | HARQ Feedback Allocation for control channel including resource shift information |
| N_ACID | 2 | Number of ACIDs for implicit cycling of HARQ channel identifier. 0b00: 2 0b01: 3 0b10: 4 0b11: 8 |
| Initial_ACID | 4 | Initial value of HARQ channel identifier for implicit cycling of HARQ channel identifiers. |
| Reserved | 17 | Reserved Bits |

TABLE 6

| Syntax | Size (bit) | Description/Notes |
|---|---|---|
| DL Persistent Allocation A-MAP_IE( ) { | — | — |
| A-MAP IE Type | 4 | DL Persistent Allocation A-MAP IE |
| Resource Shift Indicator | 1 | 0b0: No resource shift 0b1: Resource is shifted |
| If(Resource Shift Indicator == 1) { | | |
| Shift Offset | 4 | Shifted Subchannel offset value 0b0000: −8 0b0001: −7 0b0010: −6 0b0011: −5 0b0100: −4 0b0101: −3 0b0110: −2 0b0111: −1 0b1000: +1 0b1001: +2 0b1010: +3 0b1011: +4 0b1100: +5 0b1101: +6 0b1110: +7 0b1111: +8 |
| ISizeOffset | 5 | Offset used to compute burst size index |
| HFA | 3 | HARQ Feedback Allocation for control channel including resource shift information |
| MEF | 2 | MIMO encoder format 0b00: SFBC 0b01: Vertical encoding 0b10: Multi-layer encoding 0b11: CDR |
| if (MEF == 0b01){ | | Parameters for vertical encoding |
| Mt | 3 | Number of streams in transmission Nt: Number of transmit antennas at the ABS 0b000: 1 stream 0b001: 2 streams 0b010: 3 streams 0b011: 4 streams 0b100: 5 streams 0b101: 6 streams 0b110: 7 streams 0b111: 8 streams |
| Reserved | 1 | |
| } else if(MEF == 0b10){ | | Parameters for multi-layer encoding |
| Si | 4 | Index to identify the combination of the number of streams and the allocated pilot stream index in a transmission with MU-MIMO, and the modulation constellation of paired user in the case of 2 stream transmission 0b0000: 2 streams with PSI = stream1 and other modulation = QPSK 0b0001: 2 streams with PSI = stream1 and other modulation = 16QAM |

TABLE 6-continued

| Syntax | Size (bit) | Description/Notes |
|---|---|---|
| | | 0b0010: 2 streams with PSI = stream1 and other modulation = 64QAM |
| | | 0b0011: 2 streams with PSI = stream1 and other modulation information not available |
| | | 0b0100: 2 streams with PSI = stream2 and other modulation = QPSK |
| | | 0b0101: 2 streams with PSI = stream2 and other modulation = 16QAM |
| | | 0b0110: 2 streams with PSI = stream2 and other modulation = 64QAM |
| | | 0b0111: 2 streams with PSI = stream2 and other modulation information not available |
| | | 0b1000: 3 streams with PSI = stream1 |
| | | 0b1001: 3 streams with PSI = stream2 |
| | | 0b1010: 3 streams with PSI = stream3 |
| | | 0b1011: 4 streams with PSI = stream1 |
| | | 0b1100: 4 stream with PSI = stream2 |
| | | 0b1101: 4 streams with PSI = stream3 |
| | | 0b1110: 4 streams with PSI = stream4 |
| | | 0b1111: n/a |
| } | — | — |
| Reserved | 13 | Reserved Bits |
| ... | ... | ... |
| Reserved | 15 | Reserved bits |
| ... | ... | ... |
| Reserved | 1 | Reserved bits |

TABLE 7

| Syntax | Size (bit) | Description/Notes |
|---|---|---|
| DL Persistent Allocation A-MAP IE( ) { | — | — |
| A-MAP IE Type | 4 | DL Persistent Allocation A-MAP IE |
| Allocation Period | 2 | Period of persistent allocation. If (Allocation Period == 0b00), it indicates the deallocation of a persistently allocated resource. |
| | | 0b00: deallocation/modification |
| | | 0b01: 2 frames |
| | | 0b10: 4 frames |
| | | 0b11: 8 frames |
| if (Allocation Period==0b00){ | — | — |
| Resource Shift Indicator | 1 | 0b0: No resource shift |
| | | 0b1: Resource is shifted |
| If(Resource Shift Indicator == 1) { | | |
| Shift Offset | 4 | Shifted Subchannel offset value |
| | | 0b0000: −8 |
| | | 0b0001: −7 |
| | | 0b0010: −6 |
| | | 0b0011: −5 |
| | | 0b0100: −4 |
| | | 0b0101: −3 |
| | | 0b0110: −2 |
| | | 0b0111: −1 |
| | | 0b1000: +1 |
| | | 0b1001: +2 |
| | | 0b1010: +3 |
| | | 0b1011: +4 |
| | | 0b1100: +5 |
| | | 0b1101: +6 |
| | | 0b1110: +7 |
| | | 0b1111: +8 |
| HFA | 6 | Explicit Index for HARQ Feedback Allocation to acknowledge receipt of deallocation A-MAP IE |
| Reserved | 23 | Reserved bits |

TABLE 8

| Syntax | Size (bit) | Description/Notes |
|---|---|---|
| DL Persistent Allocation A-MAP_IE( ) { | — | — |
| A-MAP IE Type | 4 | DL Persistent Allocation A-MAP IE |
| Allocation Period | 2 | Period of persistent allocation. If (Allocation Period == 0b00), it indicates the deallocation of a persistently |

TABLE 8-continued

| Syntax | Size (bit) | Description/Notes |
|---|---|---|
| | | allocated resource. |
| | | 0b00: deallocation/modification |
| | | 0b01: 2 frames |
| | | 0b10: 4 frames |
| | | 0b11: 8 frames |
| if (Allocation Period==0b00){ | — | — |
| Resource Shift Indicator | 1 | 0b0: No resource shift |
| | | 0b1: Resource is shifted |
| If(Resource Shift Indicator == 1) { | | |
| Shift Offset | 4 | Shifted Subchannel offset value |
| | | 0b0000: −8 |
| | | 0b0001: −7 |
| | | 0b0010: −6 |
| | | 0b0011: −5 |
| | | 0b0100: −4 |
| | | 0b0101: −3 |
| | | 0b0110: −2 |
| | | 0b0111: −1 |
| | | 0b1000: +1 |
| | | 0b1001: +2 |
| | | 0b1010: +3 |
| | | 0b1011: +4 |
| | | 0b1100: +5 |
| | | 0b1101: +6 |
| | | 0b1110: +7 |
| | | 0b1111: +8 |
| ISizeOffset | 5 | Offset used to compute burst size index |
| 'HFA | 6 | Explicit Index for HARQ Feedback Allocation to acknowledge receipt of deallocation A-MAP IE |

TABLE 9

| Syntax | Size (bit) | Description/Notes |
|---|---|---|
| DL Persistent Allocation A-MAP_IE( ) { | — | — |
| A-MAP IE Type | 4 | DL Persistent Allocation A-MAP IE |
| Allocation Period | 2 | Period of persistent allocation. If (Allocation Period == 0b00), it indicates the deallocation of a persistently allocated resource. |
| | | 0b00: deallocation/modification |
| | | 0b01: 2 frames |
| | | 0b10: 4 frames |
| | | 0b11: 8 frames |
| if (Allocation Period==0b00){ | — | — |
| Resource Shift Indicator | 1 | 0b0: No resource shift |
| | | 0b1: Resource is shifted |
| If(Resource Shift Indicator == 1) { | | |
| Shift Offset | 4 | Shifted Subchannel offset value |
| | | 0b0000: −8 |
| | | 0b0001: −7 |
| | | 0b0010: −6 |
| | | 0b0011: −5 |
| | | 0b0100: −4 |
| | | 0b0101: −3 |
| | | 0b0110: −2 |
| | | 0b0111: −1 |
| | | 0b1000: +1 |
| | | 0b1001: +2 |
| | | 0b1010: +3 |
| | | 0b1011: +4 |
| | | 0b1100: +5 |
| | | 0b1101: +6 |
| | | 0b1110: +7 |
| | | 0b1111: +8 |
| ISizeOffset | 5 | Offset used to compute burst size index |
| MEF | 2 | MIMO encoder format |
| | | 0b00: SFBC |
| | | 0b01: Vertical encoding |
| | | 0b10: Multi-layer encoding |
| | | 0b11: CDR |
| if (MEF == 0b01){ | | Parameters for vertical encoding |
| Mt | 3 | Number of streams in transmission |
| | | Nt: Number of transmit antennas at the ABS |
| | | 0b000: 1 stream |
| | | 0b001: 2 streams |

TABLE 9-continued

| Syntax | Size (bit) | Description/Notes |
|---|---|---|
| | | 0b010: 3 streams |
| | | 0b011: 4 streams |
| | | 0b100: 5 streams |
| | | 0b101: 6 streams |
| | | 0b110: 7 streams |
| | | 0b111: 8 streams |
| Reserved | 1 | |
| } else if(MEF == 0b10){ | | Parameters for multi-layer encoding |
| Si | 4 | Index to identify the combination of the number of streams and the allocated pilot stream index in a transmission with MU-MIMO, and the modulation constellation of paired user in the case of 2 stream transmission |
| | | 0b0000: 2 streams with PSI = stream1 and other modulation = QPSK |
| | | 0b0001: 2 streams with PSI = stream1 and other modulation = 16QAM |
| | | 0b0010: 2 streams with PSI = stream1 and other modulation = 64QAM |
| | | 0b0011: 2 streams with PSI = stream1 and other modulation information not available |
| | | 0b0100: 2 streams with PSI = stream2 and other modulation = QPSK |
| | | 0b0101: 2 streams with PSI = stream2 and other modulation = 16QAM |
| | | 0b0110: 2 streams with PSI = stream2 and other modulation = 64QAM |
| | | 0b0111: 2 streams with PSI = stream2 and other modulation information not available |
| | | 0b1000: 3 streams with PSI = stream1 |
| | | 0b1001: 3 streams with PSI = stream2 |
| | | 0b1010: 3 streams with PSI = stream3 |
| | | 0b1011: 4 streams with PSI = stream1 |
| | | 0b1100: 4 stream with PSI = stream2 |
| | | 0b1101: 4 streams with PSI = stream3 |
| | | 0b1110: 4 streams with PSI = stream4 |
| | | 01111: n/a |
| } | — | — |
| 'HFA | 6 | Explicit Index for HARQ Feedback Allocation to acknowledge receipt of deallocation A-MAP IE |
| Reserved | 13 | Reserved bits |
| } else { | | |
| ... | ... | ... |

Hereinafter, tables 10 to 16 show the exemplary embodiments of UL Persistent Allocation A-MAP IE including the resource shift information parameters.

The Resource Index field in the UL Persistent Allocation A-MAP IE is interpreted as in the DL Basic Assignment A-MAP IE with 'DL' specific terminology replaced by 'UL' equivalents. If Resource Shift Indicator field is active, previous Resource Index field is still effective along with resource Shift Offset field.

TABLE 10

| Syntax | Size (bit) | Description/Notes |
|---|---|---|
| UL Persistent Allocation A-MAP__IE( ) { | — | — |
| ... | ... | ... |
| Resource Shift Indicator | 1 | 0b0: No resource shift |
| | | 0b1: Resource is shifted |
| If(Resource Shift Indicator == 1) { | | |
| Shift Offset | 4 | Shifted Subchannel offset value |
| | | 0b0000: −8 |
| | | 0b0001: −7 |
| | | 0b0010: −6 |
| | | 0b0011: −5 |
| | | 0b0100: −4 |
| | | 0b0101: −3 |
| | | 0b0110: −2 |
| | | 0b0111: −1 |
| | | 0b1000: +1 |
| | | 0b1001: +2 |
| | | 0b1010: +3 |
| | | 0b1011: +4 |
| | | 0b1100: +5 |
| | | 0b1101: +6 |
| | | 0b1110: +7 |
| | | 0b1111: +8 |

TABLE 10-continued

| Syntax | Size (bit) | Description/Notes |
|---|---|---|
| HFA | 3 | HARQ Feedback Allocation for control channel including resource shift information |
| Reserved | 25 | Reserved bits |
| }else { | | |
| ... | ... | ... |

TABLE 11

| Syntax | Size (bit) | Description/Notes |
|---|---|---|
| UL Persistent Allocation A-MAP_IE( ) { | — | — |
| A-MAP IE Type | 4 | UL Persistent Allocation A-MAP IE |
| ... | ... | ... |
| Resource Shift Indicator | 1 | 0b0: No resource shift<br>0b1: Resource is shifted |
| If(Resource Shift Indicator == 1) { | | |
| Shift Offset | 4 | Shifted Subchannel offset value<br>0b0000: −8<br>0b0001: −7<br>0b0010: −6<br>0b0011: −5<br>0b0100: −4<br>0b0101: −3<br>0b0110: −2<br>0b0111: −1<br>0b1000: +1<br>0b1001: +2<br>0b1010: +3<br>0b1011: +4<br>0b1100: +5<br>0b1101: +6<br>0b1110: +7<br>0b1111: +8 |
| HFA | 3 | HARQ Feedback Allocation for control channel including resource shift information |
| N_ACID | 2 | Number of ACIDs for implicit cycling of HARQ channel identifier.<br>0b00: 2<br>0b01: 3<br>0b10: 4<br>0b11: 8 |
| Initial_ACID | 4 | Initial value of HARQ channel identifier for implicit cycling of HARQ channel identifiers. |
| if (D < U) { | | D: number of DL AAI subframes, U: number of UL AAI subframes |
| Allocation Relevance | 1 | 0b0: Allocation in the first UL subframe relevant to an A-MAP region<br>0b1: Allocation in the second UL subframe relevant to an A-MAP region |
| } else{ | — | — |
| Reserved | 1 | Reserved bits |
| } | — | — |
| Reserved | 18 | Reserved bits |
| }else { | | |
| ... | ... | ... |

TABLE 12

| Syntax | Size (bit) | Description/Notes |
|---|---|---|
| UL Persistent Allocation A-MAP_IE( ) { | — | — |
| A-MAP IE Type | 4 | UL Persistent Allocation A-MAP IE |
| ... | ... | ... |
| Resource Shift Indicator | 1 | 0b0: No resource shift<br>0b1: Resource is shifted |
| If(Resource Shift Indicator == 1) { | | |
| Shift Offset | 4 | Shifted Subchannel offset value<br>0b0000: −8<br>0b0001: −7<br>0b0010: −6<br>0b0011: −5<br>0b0100: −4<br>0b0101: −3 |

TABLE 12-continued

| Syntax | Size (bit) | Description/Notes |
| --- | --- | --- |
| | | 0b0110: −2 |
| | | 0b0111: −1 |
| | | 0b1000: +1 |
| | | 0b1001: +2 |
| | | 0b1010: +3 |
| | | 0b1011: +4 |
| | | 0b1100: +5 |
| | | 0b1101: +6 |
| | | 0b1110: +7 |
| | | 0b1111: +8 |
| ISizeOffset | 5 | Offset used to compute burst size index |
| HFA | 3 | HARQ Feedback Allocation for control channel including resource shift information |
| Reserved | 20 | Reserved bits |
| }else { | | |
| ... | ... | ... |

TABLE 13

| Syntax | Size (bit) | Description/Notes |
| --- | --- | --- |
| UL Persistent Allocation A-MAP_IE( ) { | — | — |
|   A-MAP IE Type | 4 | UL Persistent Allocation A-MAP IE |
|   ... | ... | ... |
|   Resource Shift Indicator | 1 | 0b0: No resource shift |
| | | 0b1: Resource is shifted |
| If(Resource Shift Indicator == 1) { | | |
| Shift Offset | 4 | Shifted Subchannel offset value |
| | | 0b0000: −8 |
| | | 0b0001: −7 |
| | | 0b0010: −6 |
| | | 0b0011: −5 |
| | | 0b0100: −4 |
| | | 0b0101: −3 |
| | | 0b0110: −2 |
| | | 0b0111: −1 |
| | | 0b1000: +1 |
| | | 0b1001: +2 |
| | | 0b1010: +3 |
| | | 0b1011: +4 |
| | | 0b1100: +5 |
| | | 0b1101: +6 |
| | | 0b1110: +7 |
| | | 0b1111: +8 |
| ISizeOffset | 5 | Offset used to compute burst size index |
| HFA | 3 | HARQ Feedback Allocation for control channel including resource shift information |
| Reserved | 20 | Reserved bits |
| }else { | | |
| ... | ... | ... |

TABLE 14

| Syntax | Size (bit) | Description/Notes |
| --- | --- | --- |
| UL Persistent Allocation A-MAP_IE( ) { | — | — |
|   A-MAP IE Type | 4 | UL Persistent Allocation A-MAP IE |
|   Allocation Period | 2 | Period of persistent allocation. If (Allocation Period == 0b00), it indicates the deallocation of a persistently allocated resource. |
| | | 0b00: deallocation/modification |
| | | 0b01: 2 frames |
| | | 0b10: 4 frames |
| | | 0b11: 8 frames |
| if (Allocation Period==0b00){ | — | — |
| Resource Shift Indicator | 1 | 0b0: No resource shift |
| | | 0b1: Resource is shifted |
| If(Resource Shift Indicator == 1) { | | |
| Shift Offset | 4 | Shifted Subchannel offset value |
| | | 0b0000: −8 |
| | | 0b0001: −7 |
| | | 0b0010: −6 |
| | | 0b0011: −5 |

TABLE 14-continued

| Syntax | Size (bit) | Description/Notes |
|---|---|---|
| | | 0b0100: −4 |
| | | 0b0101: −3 |
| | | 0b0110: −2 |
| | | 0b0111: −1 |
| | | 0b1000: +1 |
| | | 0b1001: +2 |
| | | 0b1010: +3 |
| | | 0b1011: +4 |
| | | 0b1100: +5 |
| | | 0b1101: +6 |
| | | 0b1110: +7 |
| | | 0b1111: +8 |
| HFA | 3 | HARQ Feedback Allocation for control channel including resource shift information |
| Reserved | 26 | Reserved bits |

TABLE 15

| Syntax | Size (bit) | Description/Notes |
|---|---|---|
| UL Persistent Allocation A-MAP_IE( ) { | — | — |
|   A-MAP IE Type | 4 | UL Persistent Allocation A-MAP IE |
|   Allocation Period | 2 | Period of persistent allocation. If (Allocation Period == 0b00), it indicates the deallocation of a persistently allocated resource.<br>0b00: deallocation/modification<br>0b01: 2 frames<br>0b10: 4 frames<br>0b11: 8 frames |
|   if (Allocation Period==0b00){ | — | — |
|   Resource Shift Indicator | 1 | 0b0: No resource shift<br>0b1: Resource is shifted |
|   If(Resource Shift Indicator == 1) { | | |
|   Shift Offset | 4 | Shifted Subchannel offset value<br>0b0000: −8<br>0b0001: −7<br>0b0010: −6<br>0b0011: −5<br>0b0100: −4<br>0b0101: −3<br>0b0110: −2<br>0b0111: −1<br>0b1000: +1<br>0b1001: +2<br>0b1010: +3<br>0b1011: +4<br>0b1100: +5<br>0b1101: +6<br>0b1110: +7<br>0b1111: +8 |
|   ISizeOffset | 5 | Offset used to compute burst size index |
|   HFA | 3 | HARQ Feedback Allocation for control channel including resource shift information |

TABLE 16

| Syntax | Size (bit) | Description/Notes |
|---|---|---|
| UL Persistent Allocation A-MAP_IE( ) { | — | — |
|   A-MAP IE Type | 4 | UL Persistent Allocation A-MAP IE |
|   Allocation Period | 2 | Period of persistent allocation. If (Allocation Period == 0b00), it indicates the deallocation of a persistently allocated resource.<br>0b00: deallocation/modification<br>0b01: 2 frames<br>0b10: 4 frames<br>0b11: 8 frames |
|   if (Allocation Period==0b00){ | — | — |
|   Resource Shift Indicator | 1 | 0b0: No resource shift<br>0b1: Resource is shifted |
|   If(Resource Shift Indicator == 1) { | | |
|   Shift Offset | 4 | Shifted Subchannel offset value<br>0b0000: −8 |

TABLE 16-continued

| Syntax | Size (bit) | Description/Notes |
|---|---|---|
| | | 0b0001: −7 |
| | | 0b0010: −6 |
| | | 0b0011: −5 |
| | | 0b0100: −4 |
| | | 0b0101: −3 |
| | | 0b0110: −2 |
| | | 0b0111: −1 |
| | | 0b1000: +1 |
| | | 0b1001: +2 |
| | | 0b1010: +3 |
| | | 0b1011: +4 |
| | | 0b1100: +5 |
| | | 0b1101: +6 |
| | | 0b1110: +7 |
| | | 0b1111: +8 |
| ISizeOffset | 5 | Offset used to compute burst size index |
| Mt | 1 | Number of streams in transmission Mt ≤ Nt up to 2 streams per AMS supported |
| | | Nt: Number of transmit antennas at the AMS |
| | | 0b0: 1 stream |
| | | 0b1: 2 streams |
| TNS | 2 | Total number of streams in the LRU for CSM |
| | | 0b00: reserved |
| | | 0b01: 2 streams |
| | | 0b10: 3 streams |
| | | 0b11: 4 streams |
| if(TNS >Mt){ | — | — |
| SI | 2 | First pilot index for CSM with TNS = 2 streams: 0b00, 0b01 |
| | | First pilot index for CSM with TNS = 3,4 streams: 0b00, 0b01, 0b10, 0b11 |
| } | | |
| else if (TNS == Mt) { | | |
| MEF | 1 | MIMO encoder format |
| | | 0b0: SFBC |
| | | 0b1: Vertical encoding |
| Reserved | 1 | Reserved bits |
| } | — | — |
| PF | 1 | Precoding Flag |
| | | 0b0: non adaptive precoding |
| | | 0b1: adaptive precoding using the precoder of rank Mt of the AMS's choice |
| HFA | 3 | HARQ Feedback Allocation for control channel including resource shift information |
| Reserved | 15 | Reserved bits |
| } else { | | |
| ... | ... | ... |
| Reserved | 15 | Reserved bits |
| ... | ... | ... |

The control channel can be utilized for the new packet allocation or de-allocation or modification regarding persistent allocation.

Additionally, to guarantee the reliability, the HARQ process is supported to this control channel. In other words, confirmation process should be supported for this control channel by ACK and/or NACK mechanism.

When control channel detection is failed while resource shift operation is supported, all related resources get damaged due to collision between previous resource allocation policy and shifted version. To prevent this problem, it requires confirmation for the receiving of control channel correctly.

In this invention, I propose adding of HFA to confirming whether receiving of control channel regarding persistent allocation correctly or not.

As described above, when common control channel is applied to support persistent allocation, all persistent allocated MSs should read the common control channel irrespective of the requirement. It causes unnecessary operational overhead.

In this invention, BS notifies to the MS whether to read the common control channel through the broadcasting channel (e.g. BCH or non-user specific control channel etc.). There are some cases of examples to notify whether the MS have to read the common control channel (e.g. DL Composite Persistent Allocation A-MAP IE).

There are exemplary embodiments regarding event notification indicator in below.

(1) 1 bit indicator e.g.) DL Composite Persistent Allocation A-MAP IE Indicator

0b0—no event

0b1—read the common control channel e.g.) DL Resource Shift Indicator   0b0—no resource shift   0b1—resource shift (2) 2 bits indicator e.g.) DL Composite Persistent Allocation A-MAP IE Indicator   0b00—no event   0b01—allocation   0b10—de-allocation   0b11—modification (or resource shift)

Figure 5:
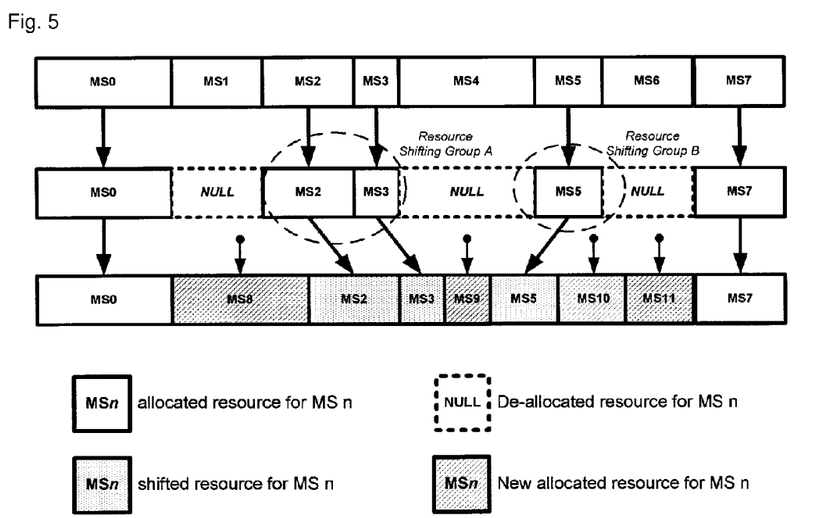
FIG. 5 illustrates multiple shift offset supporting.

FIG. 5 illustrates multiple shift offset supporting.

At the certain time, many resource holes can be created. To maximize the bandwidth efficiency, the control channel includes multiple offset for each persistent allocation group.

In other words, if the control channel is common, the control channel includes multiple offset values and (reduced) user identifier. If the control channel is individual type, each control channels which have various shift offset are transmitted to each MSs who have shifted resources.

Figure 6:
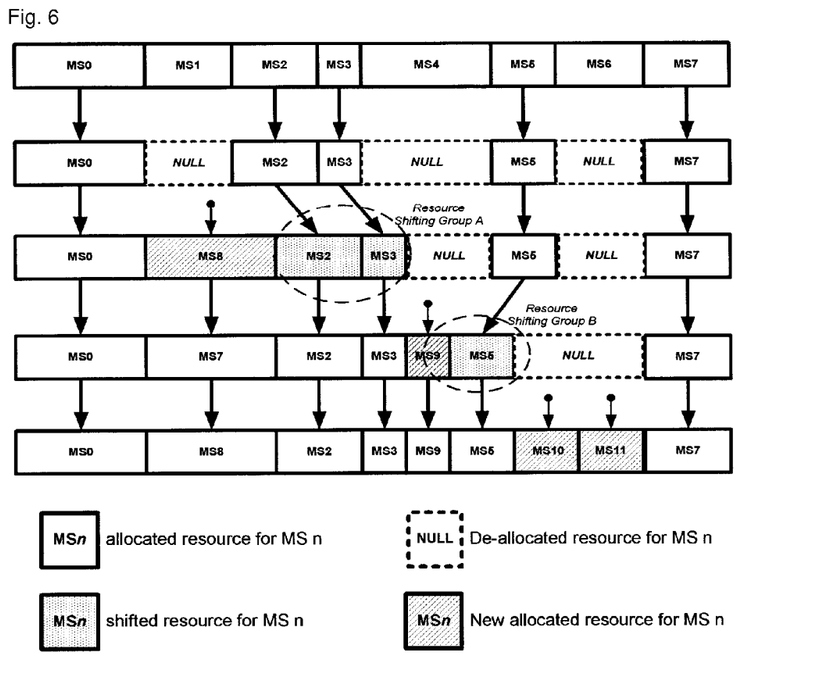
FIG. 6 illustrates single shift offset supporting.

FIG. 6 illustrates single shift offset supporting.

When multi-shift offset is supported, if there is error in the control channel information for the modification of control channel, shifted resources are collided with non-shifted resources. As a result, the packet loss is increased extremely.

To prevent this problem, the control channel includes only single offset value.

In other words, if the control channel is common, the control channel includes single offset value and (reduced) user identifier. If the control channel is individual type, the control channels which has single same shift offset are transmitted to each MSs who have shifted resources.

In this case, the error handle for control channel can be performed individually increasing reliability.

Figure 7:
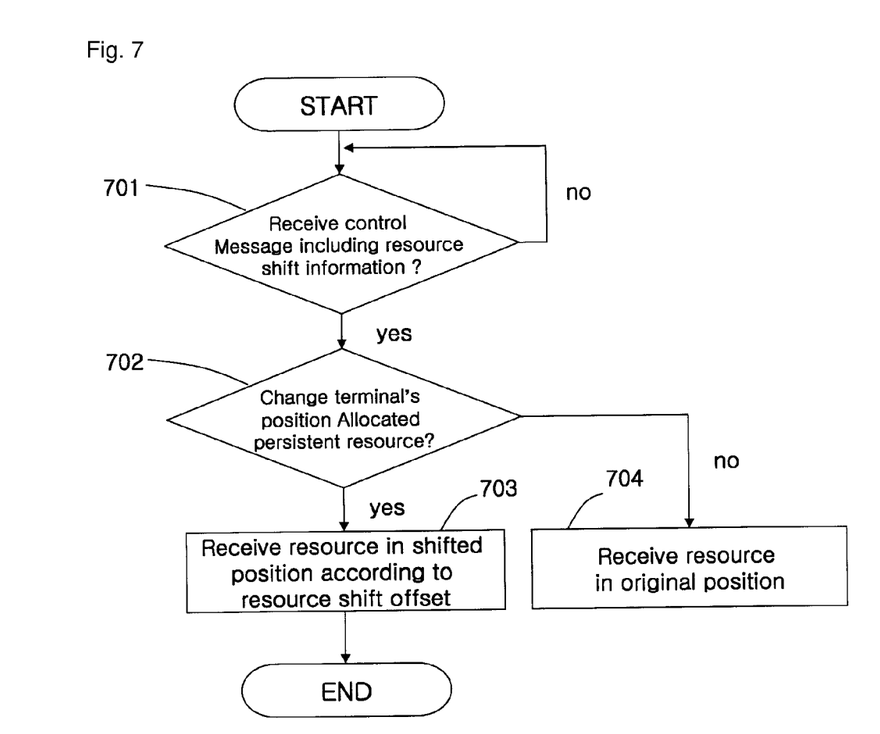
FIG. 7 illustrates a process for receiving allocated resources, by a terminal, in a wireless access communication system according to this invention.

FIG. 7 illustrates a process for receiving allocated resources, by a terminal, in a wireless access communication system according to this invention.

First, the terminal receives a control message including a resource shift information from the BS. The control message may be a Persistent Allocation A-MAP IE or a Group Resource Allocation A-MAP IE.

If the control message is the Group Resource Allocation A-MAP IE, the control message further includes an information regarding a persistent allocation period.

Also, the terminal transmits a response (ACK/NACK) in response of the received control message including the HARQ feedback allocation information to the BS.

Next, the terminal checks the resource shift information included in the received the control message. Wherein the resource shift information comprises a resource shift indicator, a resource shift offset and the HARQ feedback allocation for the control message. The resource shift offset has a positive value or a negative value.

If the resource shift indicator is set '1', the terminal receives resource in the shifted position according to the resource shift information from the BS.

But, if the resource shift indicator is set '0', the terminal receives resource in original position.

Figure 8:
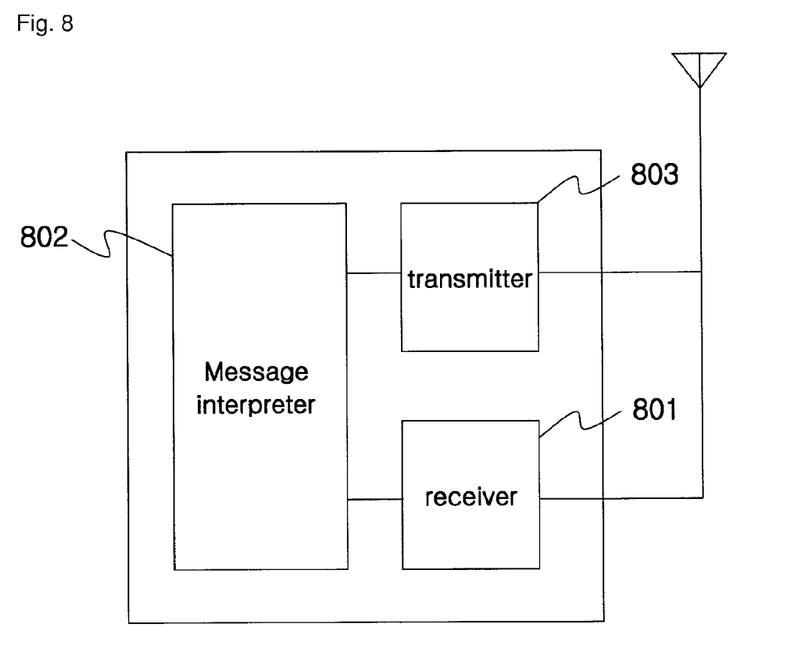
FIG. 8 illustrates an apparatus for receiving allocated resources from the BS in a wireless access communication system according to this invention.

FIG. 8 illustrates an apparatus for receiving allocated resources from the BS in a wireless access communication system according to this invention.

The apparatus comprises a receiver, a message interpreter and transmitter.

The receiver receives a control message including the resource shift information and persistently allocated resources.

The message interpreter checks the resource shift information included in the received control message. And the resource shift information comprises a resource shift indicator, a resource shift offset and a Hybrid Automatic Retransmit request (HARQ) feedback allocation for the control message.

The transmitter transmits a response (ACK/NACK) in response of the received control message including the HARQ feedback allocation information to the BS.

As described up to this point, methods according to the present invention can be realized by software, hardware, or their combination. For example, methods according to the present invention may be stored in a storage medium (e.g., internal terminal, flash memory, hard disk, etc.), and may be realized by codes or commands within a software program that is executable by a processor, such as microprocessor, controller, microcontroller, application specific integrated circuit (ASIC).

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for receiving one or more resources by a mobile station in a wireless access communication system, the method comprising:
   receiving a control message from a network;
   receiving a non-user specific control message from the network, the non-user specific control message including an indicator which indicates whether to check the control message when the control message is a common control message;
   checking the received control message whether the control message includes resource shift information when the indicator indicates that the terminal needs to check the control message, wherein the resource shift information comprises a resource shift indicator indicating that a resource allocated to the mobile station is shifted and a resource shift offset indicating a shifted offset value which is either a positive value or a negative value; and
   receiving the one or more resources shifted by the resource shift offset from the resource allocated to the mobile station.

2. The method of claim 1, further comprising:
   transmitting, to the network, a response message in response to the received control message.

3. The method of claim 1, wherein the control message is a Persistent Allocation Advanced-MAP Information Element.

4. The method of claim 1, wherein the control message is a Group Resource Allocation Advanced-MAP Information Element.

5. The method of claim 4, wherein the control message further includes information regarding a persistent allocation period.

6. An apparatus for receiving one or more resources from a network in a wireless access communication system, the apparatus comprising:
   a receiver for receiving a control message from a network, the control message including a resource shift information and persistently allocated resources and for receiving a non-user specific control message on a broadcast channel from the network, the non-user specific control message including an indicator which indicates whether to check the control message when the control message is a common control message;
   a message interpreter for checking the received control message whether the control message includes resource shift information when the indicator indicates that the apparatus needs to check the control message, wherein the resource shift information comprises a resource shift indicator indicating that a resource allocated to the mobile station is shifted and a resource shift offset indicating a shifted offset value which is either a positive value or a negative value,
   wherein the received receives the one or more resources shifted by the resource shift offset from the resource allocated to the mobile station.

7. The apparatus of claim 6, further comprising:
a transmitter for transmitting, to the network, a response in response of the received control message.

8. The apparatus of claim 6, wherein the control message is a Persistent Allocation Advanced-MAP Information Element.

9. The apparatus of claim 6, wherein the control message is a Group Resource Allocation Advanced-MAP Information Element.

10. The apparatus of claim 9, wherein the control message further includes information regarding a persistent allocation period.

* * * * *